(12) United States Patent
Lobzakov et al.

(10) Patent No.: US 8,379,860 B2
(45) Date of Patent: Feb. 19, 2013

(54) SYSTEM AND METHOD FOR ESTABLISHING A SECURE COMMUNICATION LINK

(75) Inventors: Yuriy Lobzakov, Walnut Creek, CA (US); Colin Werner, Kitchener (CA); Carsten Bergmann, San Jose, CA (US); Peter Baccay, San Jose, CA (US)

(73) Assignees: Ascendent Telecommunications, Inc., Redwood City, CA (US); Research In Motion Limited, Waterloo, Ontario (CA)

( * ) Notice: Subject to any disclaimer, the term of this patent is extended or adjusted under 35 U.S.C. 154(b) by 1030 days.

(21) Appl. No.: 12/393,671

(22) Filed: Feb. 26, 2009

(65) Prior Publication Data
US 2010/0215177 A1 Aug. 26, 2010

(51) Int. Cl.
*H04L 29/06* (2006.01)
(52) U.S. Cl. ........................... 380/274; 713/171
(58) Field of Classification Search .................. 380/274; 713/171
See application file for complete search history.

(56) References Cited

U.S. PATENT DOCUMENTS
| | | | |
|---|---|---|---|
| 2005/0154896 A1 | 7/2005 | Widman et al. | |
| 2005/0208891 A1* | 9/2005 | Khare et al. | 455/39 |
| 2010/0080128 A1* | 4/2010 | Hovey et al. | 370/238 |

FOREIGN PATENT DOCUMENTS
| | | |
|---|---|---|
| EP | 1578155 A2 | 9/2005 |
| EP | 1578155 A3 | 8/2006 |
| WO | 0174007 A1 | 10/2001 |

OTHER PUBLICATIONS

Burmester, "Robust, Anonymous RFID Authentication with Constant Key-Lookup", Mar. 18-20, 2008, ACM Symposium on Information, Computer & Communication Security (ASIACCS'08), pp. 283-291.*
SecurID, Wikipedia online article, Feb. 6, 2009, 3 pages.
European Patent Office, Extended European Search Report dated Aug. 17, 2009, issued in European Patent Application No. 09153825.6.
Matias Erny Reichl Hoffmann, Response to Extended European Search Report dated Oct. 23, 2009, filed in European Patent Application No. 09153825.6.
Canadian Intellectual Property Office, Examiner's Requisition dated Jun. 12, 2012, issued in Canadian Patent Application No. 2,692,078.

* cited by examiner

*Primary Examiner* — Kambiz Zand
*Assistant Examiner* — Michael Guirguis
(74) *Attorney, Agent, or Firm* — Norton Rose Canada LLP

(57) ABSTRACT

An enterprise communication system adapted for establishing secure wireless communication sessions, the system comprising: an enterprise platform adapted for establishing communications sessions with one or more wireless devices, and for transmitting signals to and receiving signals from the one or more wireless devices; an platform-side automatic synchronized random key generator associated with the enterprise platform for generating platform-generated synchronized random keys; the enterprise platform being adapted to: receive one or more signals representing a request to establish a communication session between the enterprise platform and at least one wireless device; receive a device-generated synchronized random key from the at least one wireless device; compare the device-generated synchronized random key to a platform-generated synchronized random key synchronized to the device-generated synchronized random key; and based on the comparison, output a signal representing a response to authorize or prohibit establishment of the communication session.

27 Claims, 15 Drawing Sheets

SYSTEM AND METHOD FOR ESTABLISHING A SECURE COMMUNICATION LINK

FIELD

The present application relates generally to telecommunications and, more specifically, to systems and methods for establishing secure communication links.

BACKGROUND

In a communication network, it is often desirable to verify the identity of a caller in an incoming call. This has been done by relying on caller identification (caller ID) from the calling party. However, there has arisen the practice of call spoofing, in which the calling party is able to adopt a spoofed caller ID different from its true caller ID. As a result, the receiving party may unknowingly accept a call from an unwanted caller. Thus, the communication link is not secure, as relying on the caller ID alone is an insecure way of identifying the calling party.

It would be desirable to provide a way to establish a secure communication link.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
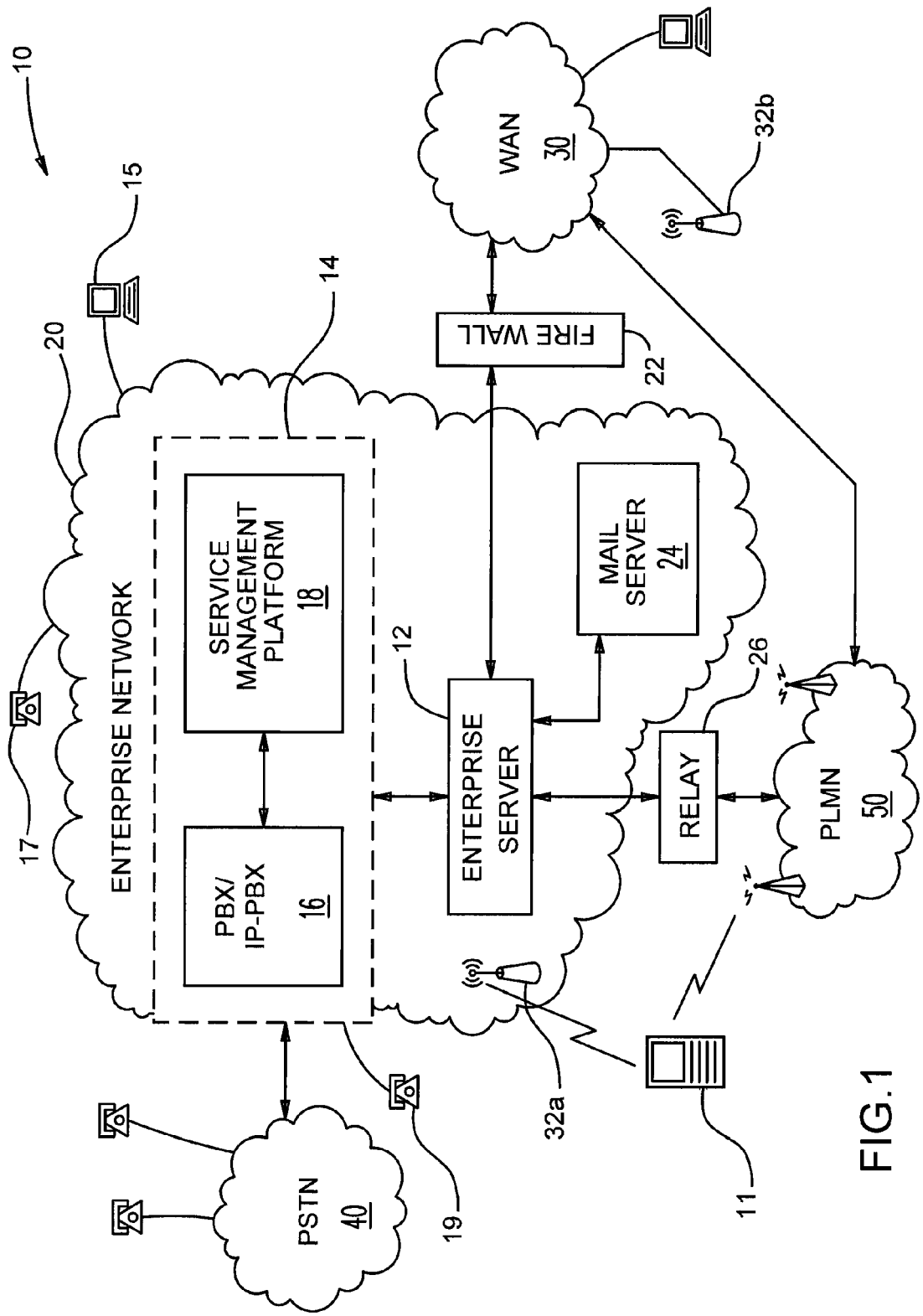
FIG. 1 shows, in block diagram form, an example system for managing enterprise-related mobile calls, including an enterprise communications platform.

In one aspect, the present application provides an enterprise communication system adapted for establishing secure wireless communication sessions. The system comprises: an enterprise platform adapted for establishing communications sessions with one or more wireless devices, and for transmitting signals to and receiving signals from the one or more wireless devices; and an platform-side automatic synchronized random key generator associated with the enterprise platform for generating platform-generated synchronized random keys. The enterprise platform is adapted to: receive one or more signals representing a request to establish a communication session between the enterprise platform and at least one wireless device; receive a device-generated synchronized random key from the at least one wireless device; compare the device-generated synchronized random key to a platform-generated synchronized random key synchronized to the device-generated synchronized random key; and based on the comparison, output a signal representing a response to authorize or prohibit establishment of the communication session.

In another aspect, the present application provides a wireless device adapted for establishing secure wireless communication sessions with an enterprise platform and for transmitting signals to and receiving signals from the enterprise platform. The wireless device comprises: a device-side automatic synchronized random key generator for generating device-generated synchronized random keys. The wireless device is adapted to: receive one or more signals representing a request to establish a communication session between the wireless device and the enterprise platform; receive a platform-generated synchronized random key from the enterprise platform; compare the platform-generated synchronized random key to a device-generated synchronized random key synchronized to the platform-generated synchronized random key; and based on the comparison, output a signal representing a response to authorize or prohibit establishment of the communication session.

In another aspect, the present application provides a method, in a server of an enterprise platform, for establishing a secure communication link between a wireless communication device in an enterprise communications system and the enterprise platform. The method comprises: receiving one or more signals representing a request to establish a communication session from the wireless device; receiving a device-generated synchronized random key from the wireless device; receiving a platform-generated synchronized random key from the enterprise platform, the platform-generated synchronized random key being synchronized with the device-generated synchronized random key; comparing the device-generated synchronized random key and the platform-generated synchronized random key; and if the keys match, outputting one or more signals authorizing the establishment of the secure communication link between the wireless device and the platform.

In another aspect, the present application provides a method, in a wireless communication device in an enterprise communications system, for establishing a secure communication link between the wireless device and an enterprise platform. The method comprises: receiving one or more signals representing a request to establish a communication session from the platform; receiving a platform-generated synchronized random key from the platform; receiving a device-generated synchronized random key, the device-generated synchronized random key being synchronized with the platform-generated synchronized random key; comparing the device-generated synchronized random key and the platform-generated synchronized random key; and if the keys match, outputting one or more signals authorizing the establishment of the secure communication link between the wireless device and the platform.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange 16 (although in various embodiments the PBX may be a standard PBX or an IP-PBX, for simplicity the description below uses the term PBX to refer to both) having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response (IVR), call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
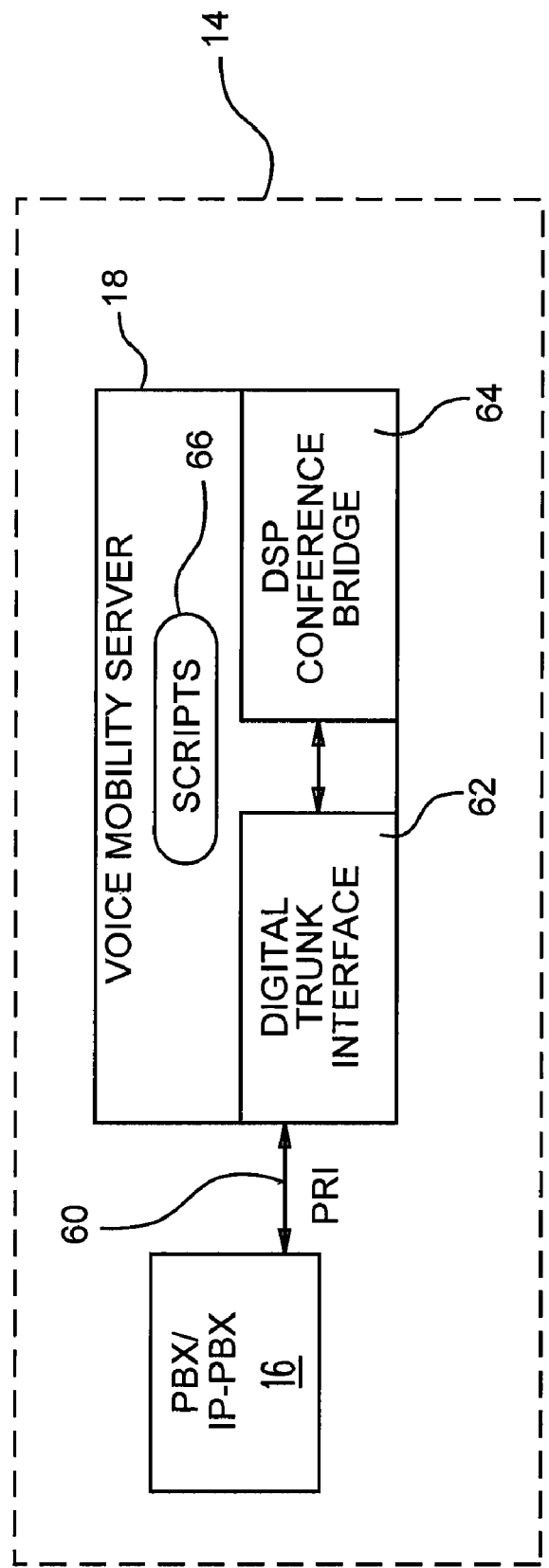
FIG. 2 shows, in block diagram form, further details of an embodiment of the enterprise communications platform.
Figure 3:
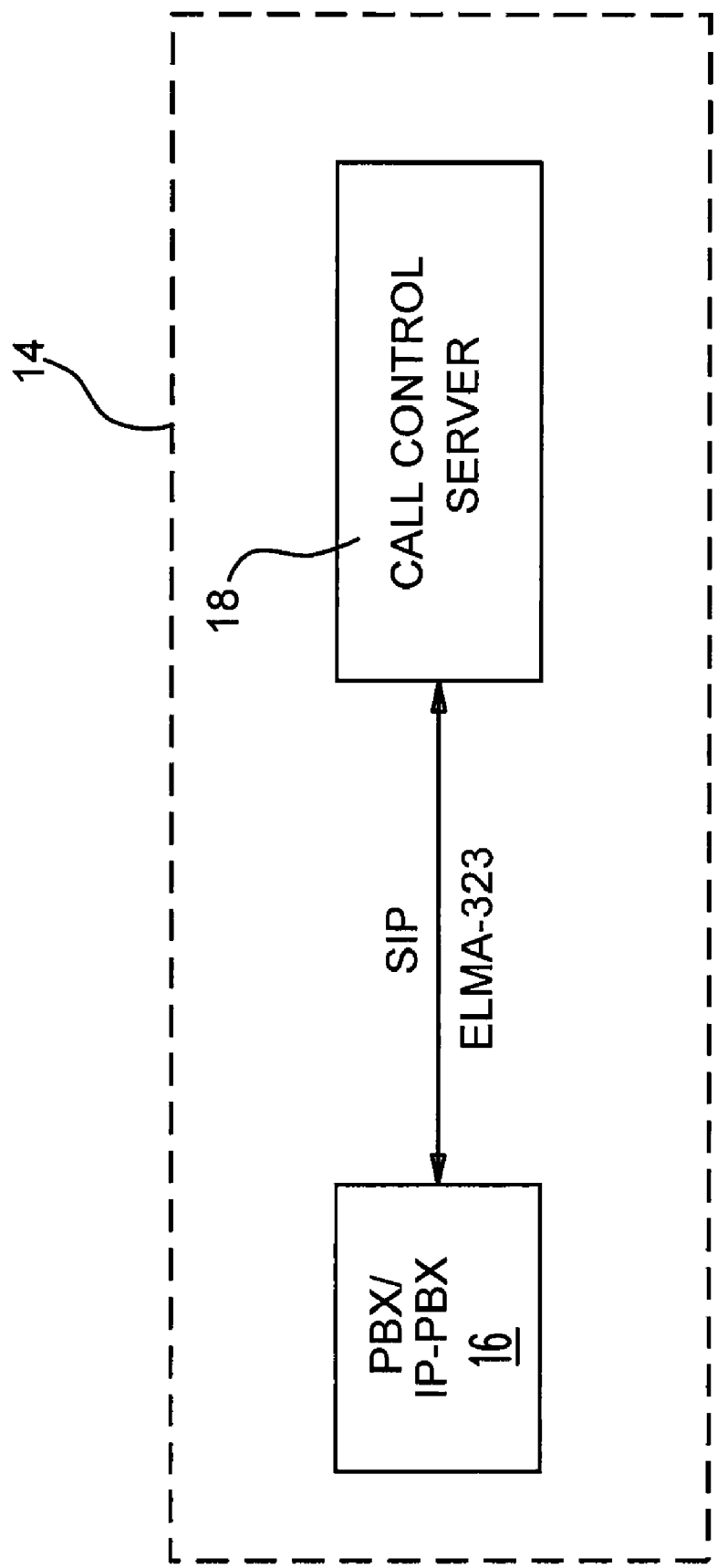
FIG. 3 shows, in block diagram form, another embodiment of the enterprise communications platform.
Figure 4:
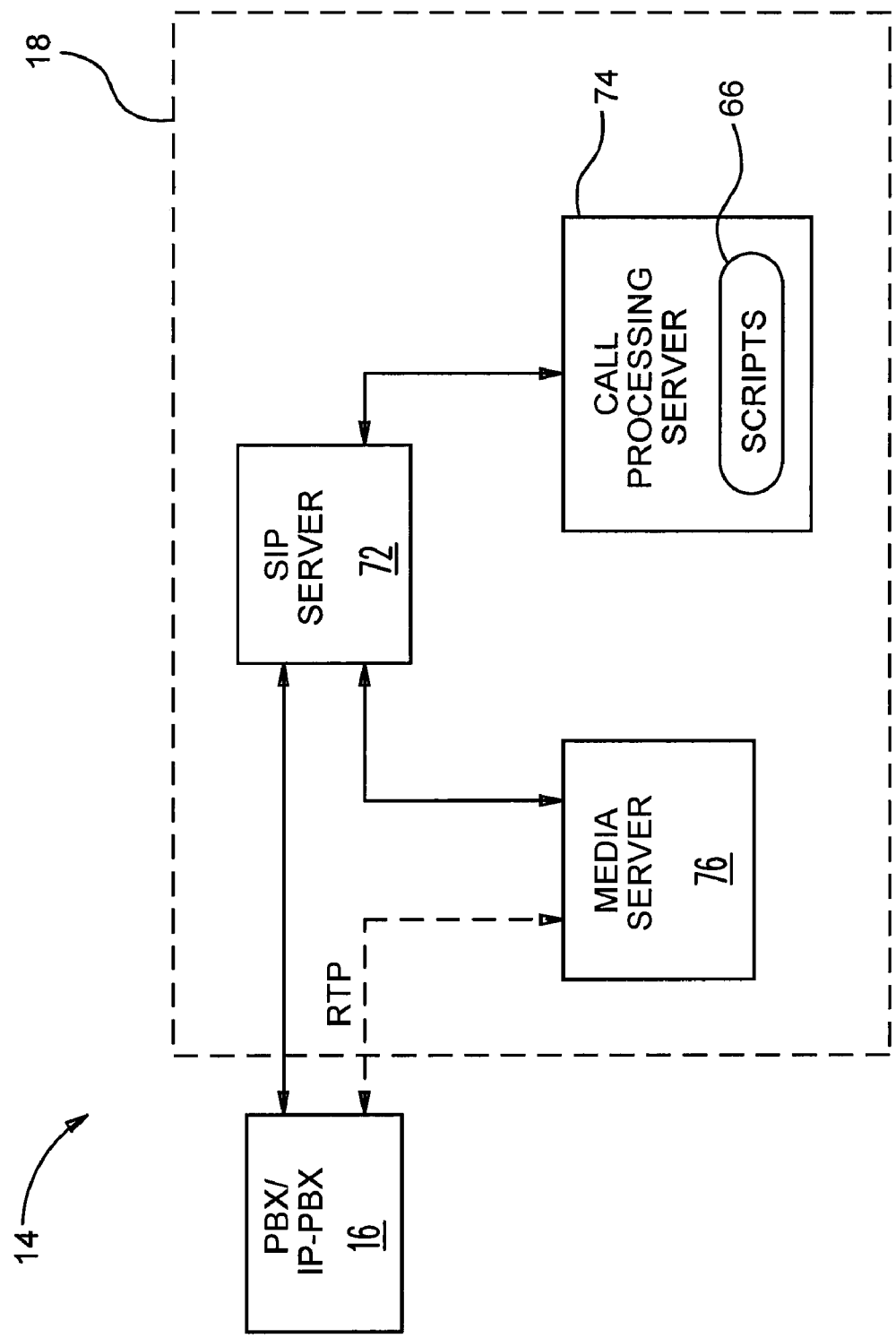
FIG. 4 shows, in block diagram form, yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk.

In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment of an enterprise communication system 14 in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5A:
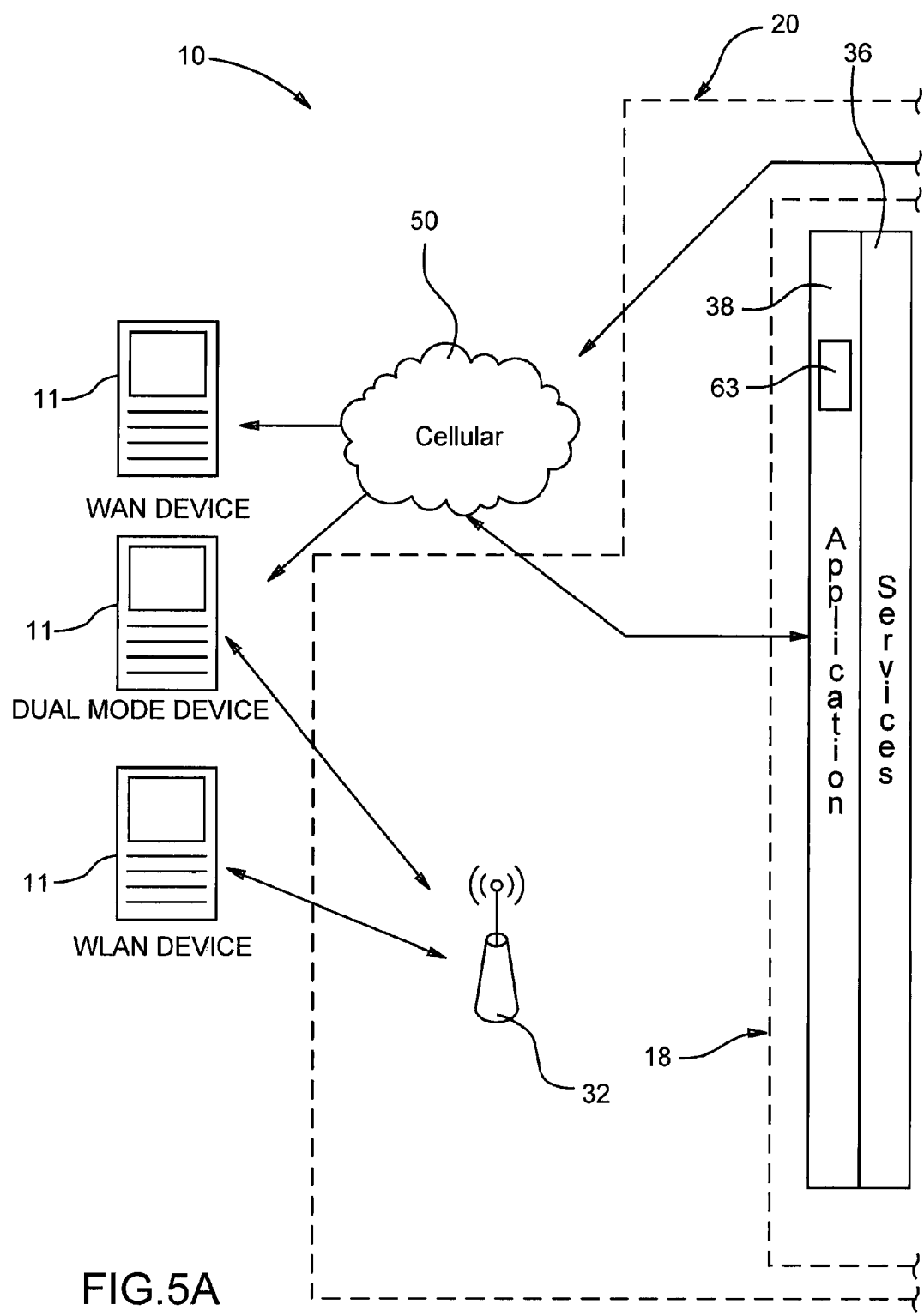
FIGS. 5A and 5B show, in block diagram form, further details of the enterprise communications platform of FIG. 3.
Figure 5B:
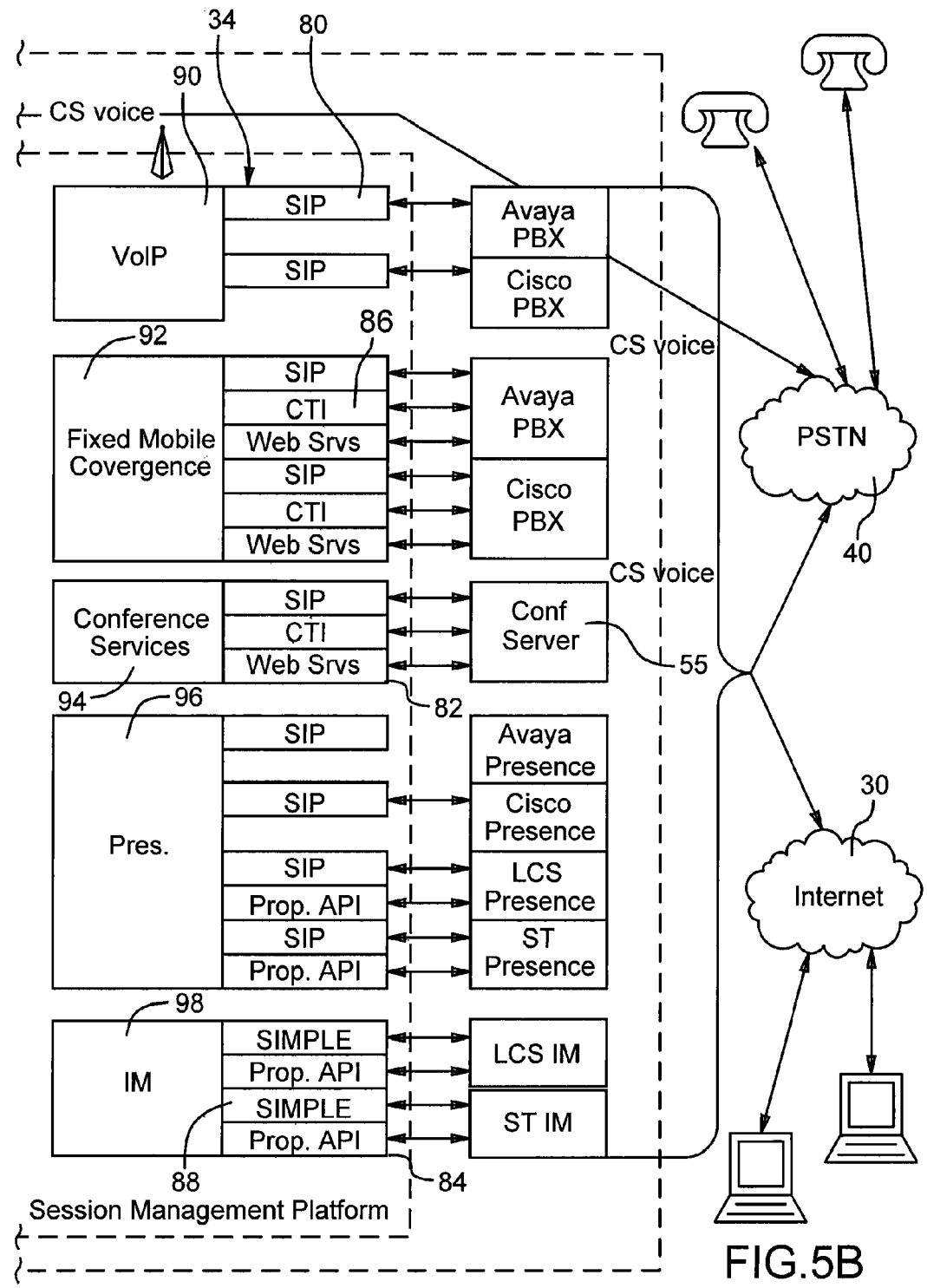

Reference is now made to FIGS. 5A and 5B, collectively referred to as FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
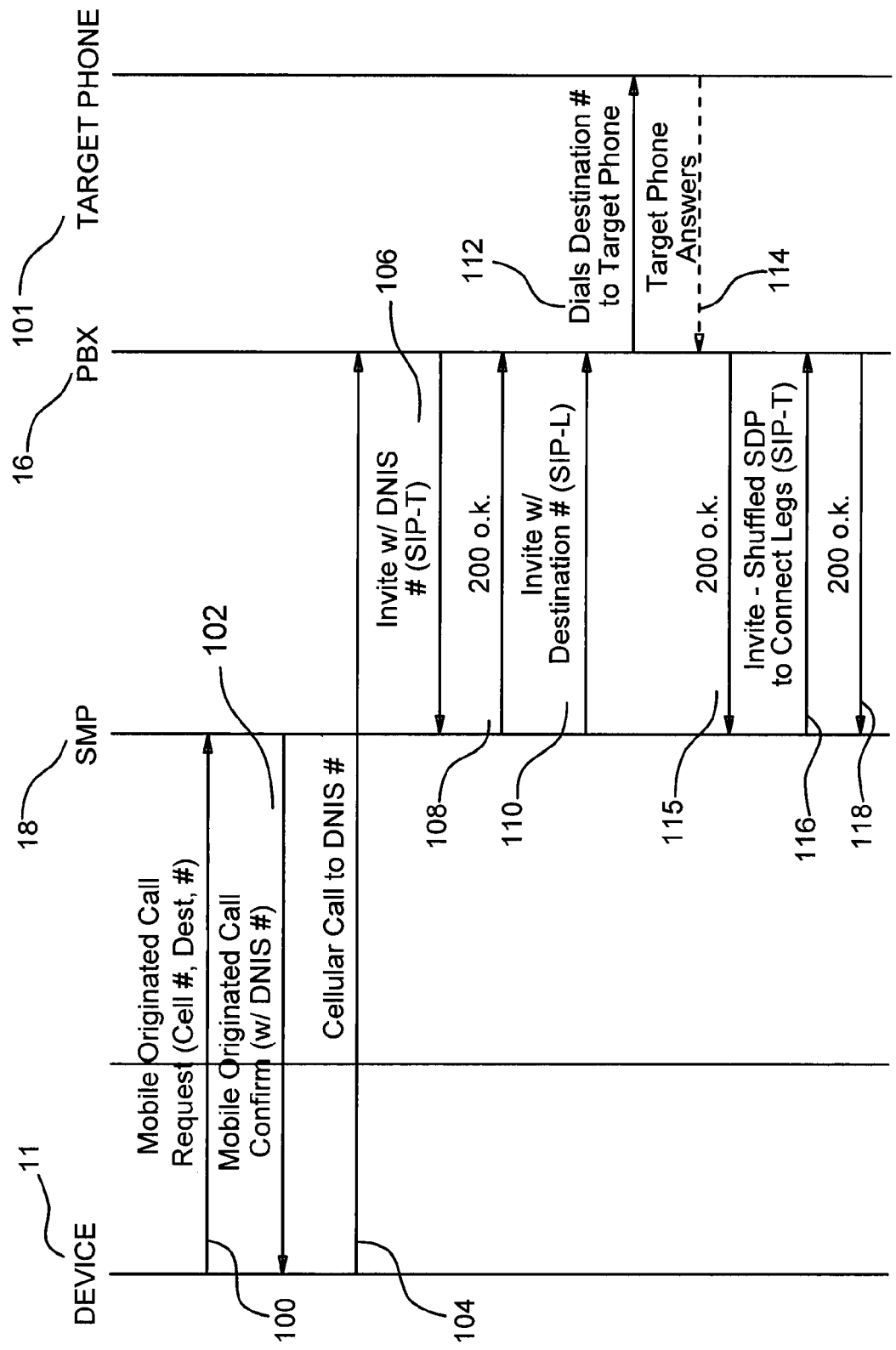
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
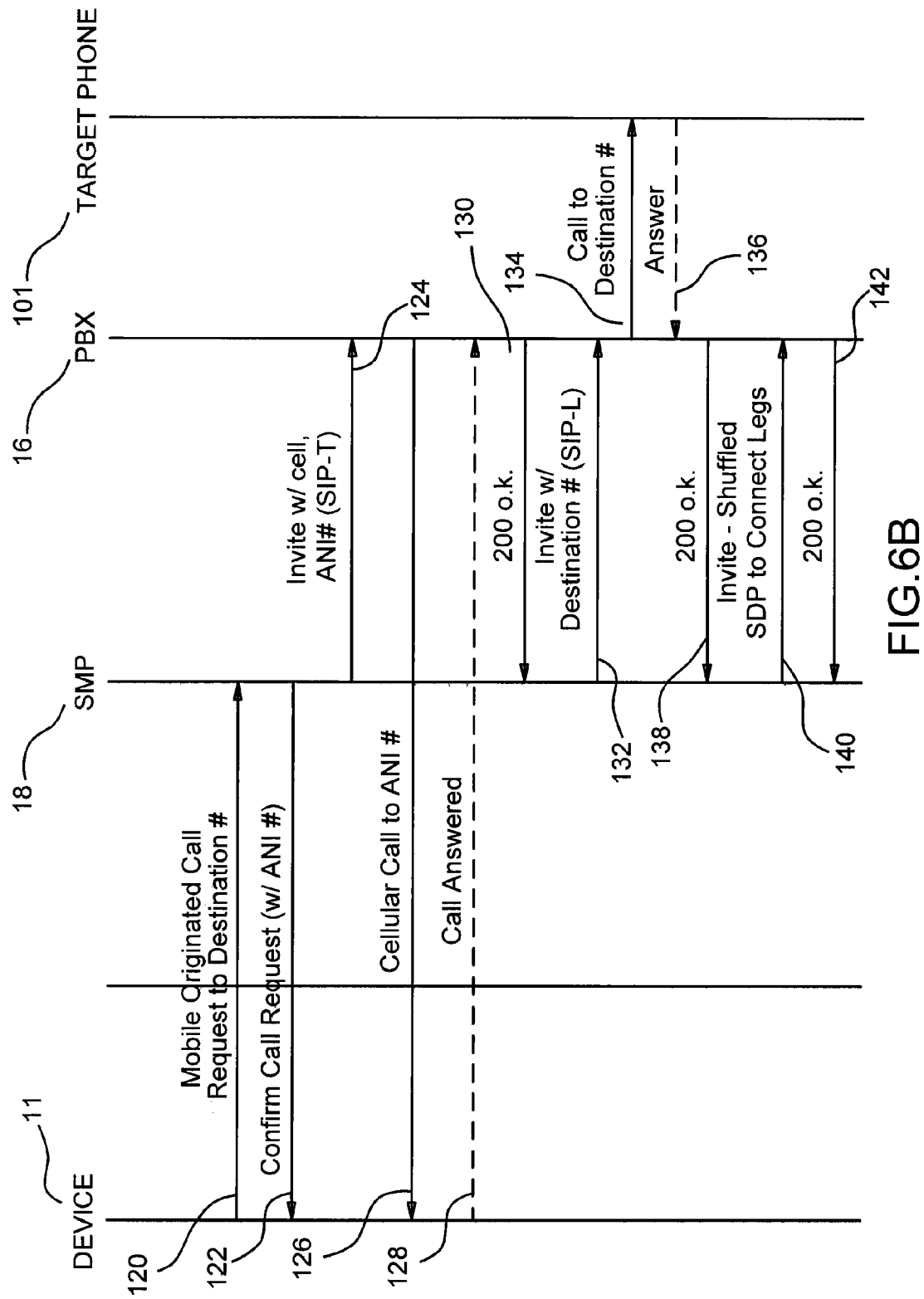
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The PBX 16 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
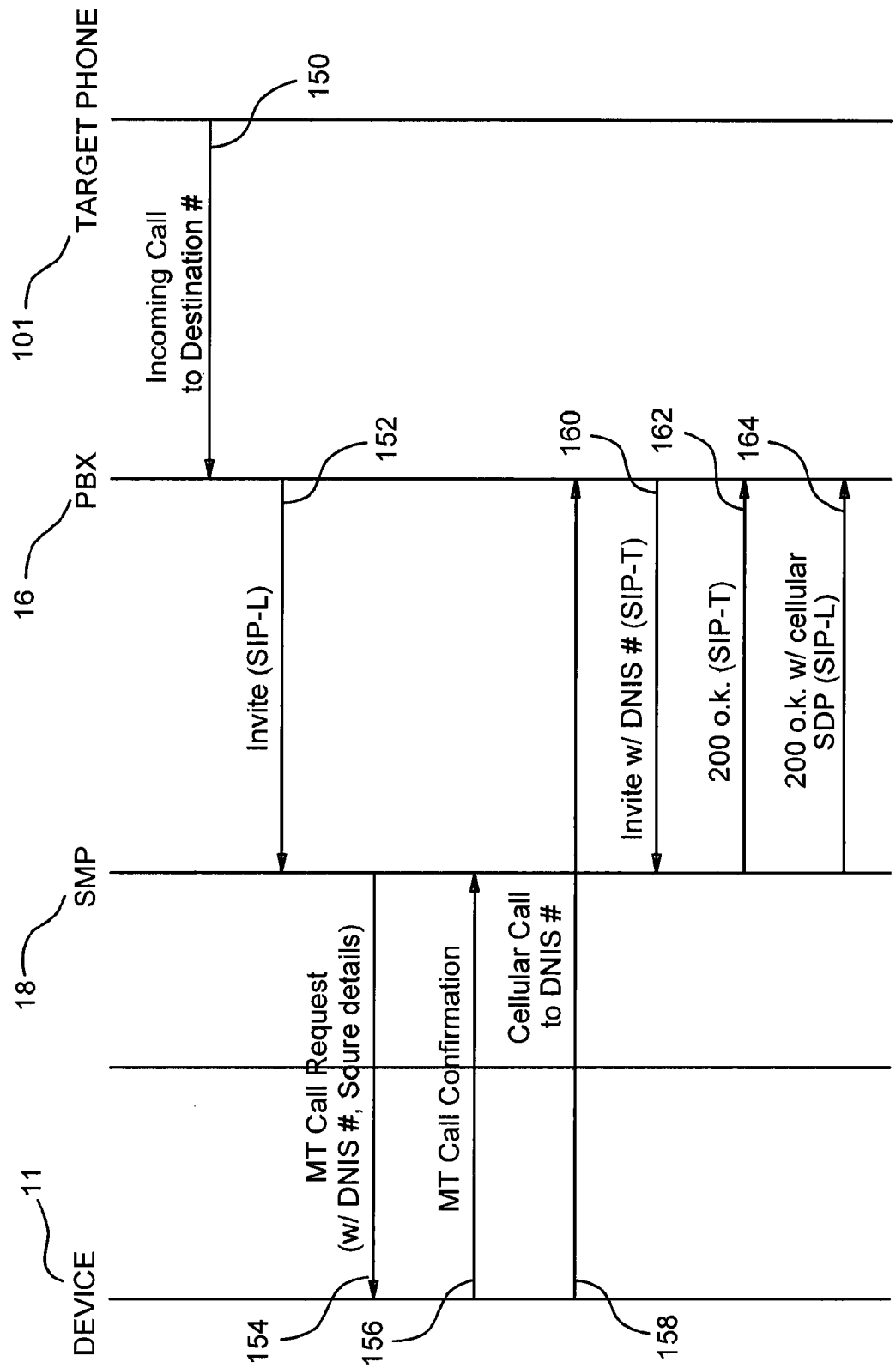
FIG. 7A is a signaling diagram generally indicating how mobile-terminated, mobile-initiated calls are processed by the network of FIG. 5.
Figure 7B:
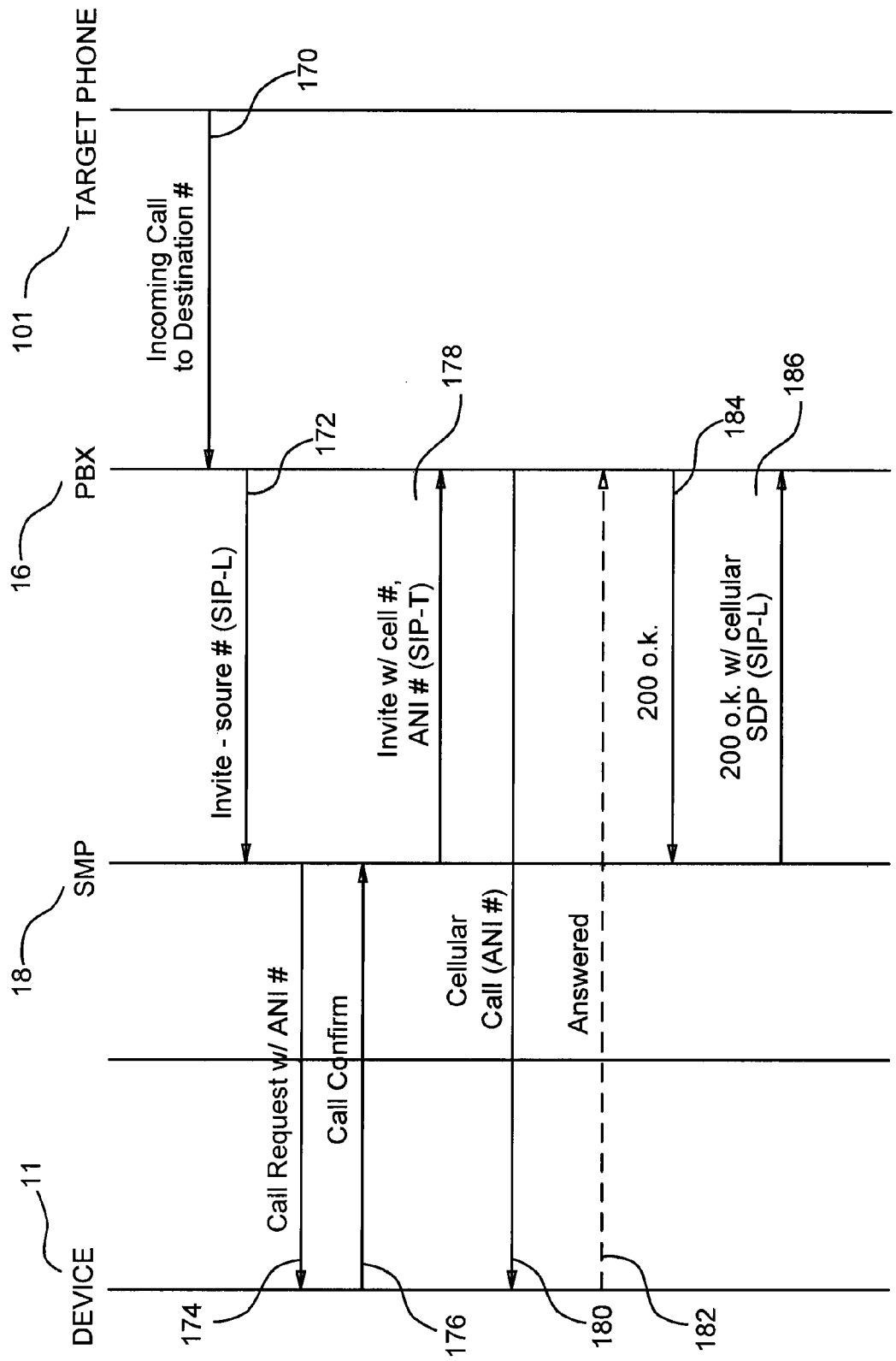
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 may remain in control of the signaling between the target phone 101 and the mobile device 11 in both the mobile-initiated and PBX-initiated calls. Again, the decision to proceed with a mobile-initiated call or a PBX-initiated call may be based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Notably, the transmission of the DNIS/ANI occur prior to establishing a secure communication link between the device and the server. Typically, as described above, this transmission takes place over a secure data connection. However, in situations where a secure data connection is not available (e.g., where the device is in a location with cellular phone service but no available data connection), identification and validation of an incoming call to the device would be limited to the existing ANI (i.e., caller ID) of the incoming call device, which is less secure, as incoming call numbers may be spoofed.

Figure 10:
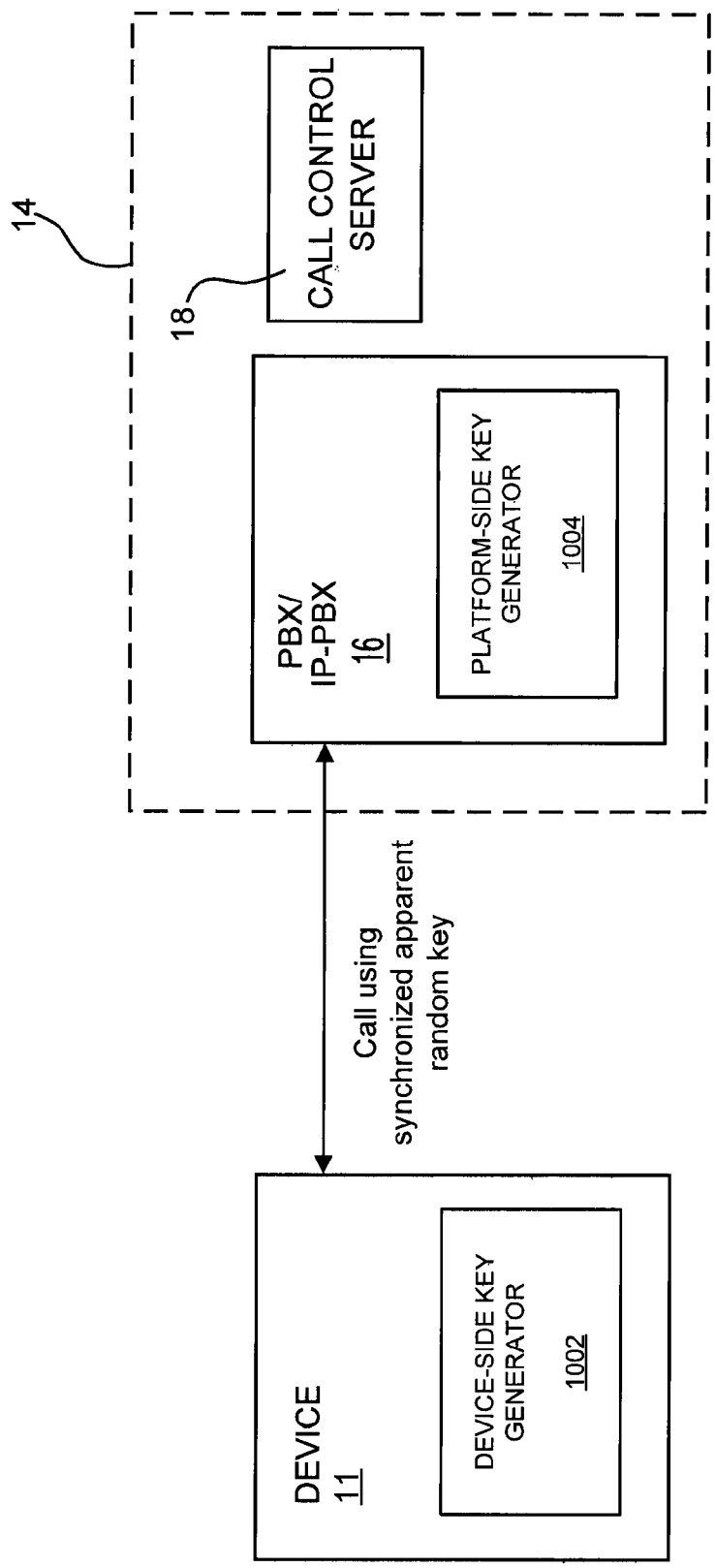
FIG. 10 is a block diagram showing a system which may be used to establish a secure communication link in accordance with one embodiment.

Reference is now made to FIG. 10, showing, in block diagram form, a system which may be used to establish a secure communication link where a data connection is not available. Selected details of the device 11 and the enterprise communication platform 14 are shown.

The device 11 and the enterprise communication platform 14 are associated with a device-side automatic synchronized random key generator 1002 and a platform-side automatic synchronized random key generator 1004, respectively. The device-side key generator 1002 may be a component of the device 11 as shown, for example it may be a module stored in the memory of the device 11; or the device-side key generator 1002 may be an external component that is securely associated with the device 11, for example it may be a module stored in a separate device that communicates with the device 11 via a short-range connection such as Bluetooth. The platform-side key generator 1004 may be a component of the PBX 16 as shown, for example it may be a module stored in the memory of the PBX 16. Alternatively, the platform-side key generator 1004 may be a component of the SMP 18 that communicates with the PBX 16; or the platform-side key generator 1004 may be separate from both the PBX 16 and the SMP 18 within the enterprise communication platform 14.

The device-side key generator 1002 and the platform-side key generator 1004 are synchronized to each other, such that each generator 1002, 1004 generates the same synchronized random key at the same time without needing any communication between the two. By synchronized random key is meant that the key generated may appear to be random, but is predictable based on certain information that is private to the two generators 1002, 1004 and is synchronized between the two generators 1002, 1004 so that the two generators 1002, 1004 separately generate the same key at about the same time. These keys may include alphanumeric characters, symbols, or may be entirely numerical. This synchronized generation may be based on each generator 1002, 1004 being designed to generate synchronized random keys using a predictable secure method (e.g., this may be programmed and synchronized at the time of manufacture of the device 11), synchronized to each other. Suitable methods for generation of the keys include the use of a hash key, the use of random number generators having a degree of predictability, and the use of strange attractors. These methods and their variations would be suitable and known to persons skilled in the art, as well as other methods of securely generating synchronized random keys in a predictable and synchronizable way. The keys may be refreshed by each generator 1002, 1004 at synchronized time periods. The time period for refreshing may be preset to accommodate the typical time required for initiating a call. For example, the time period may range from a minimum of about 5 seconds to a maximum of about 1 minute. Each refreshed key may be stored in historical data (e.g., in a memory component of the device 11 and the platform 14) until the key is replaced at the next refreshing. The key may be generated by the generator 1002, 1004 as a series of about 10 digits, for example where the key is dialed like a phone number; or the generator 1002, 1004 may generate a longer series of digits which is then mapped to a dialable series of digits to create the key. The key generators 1002, 1004 are automatic in that no input or request is needed for a key to be generated.

In the absence of a data connection, the calling party, the platform 14 or the device 11, may call the other using a generated key. This key may be verified by the receiving party, the other of the platform 14 and the device 11, against its own key generated by itself. Thus the receiving party may verify that the call is being made from the calling party and is not a spoofed call from a third party. Having verified the identity of the calling party, the receiving party may accept the call and a secure communication link is thus established.

Figure 8A:
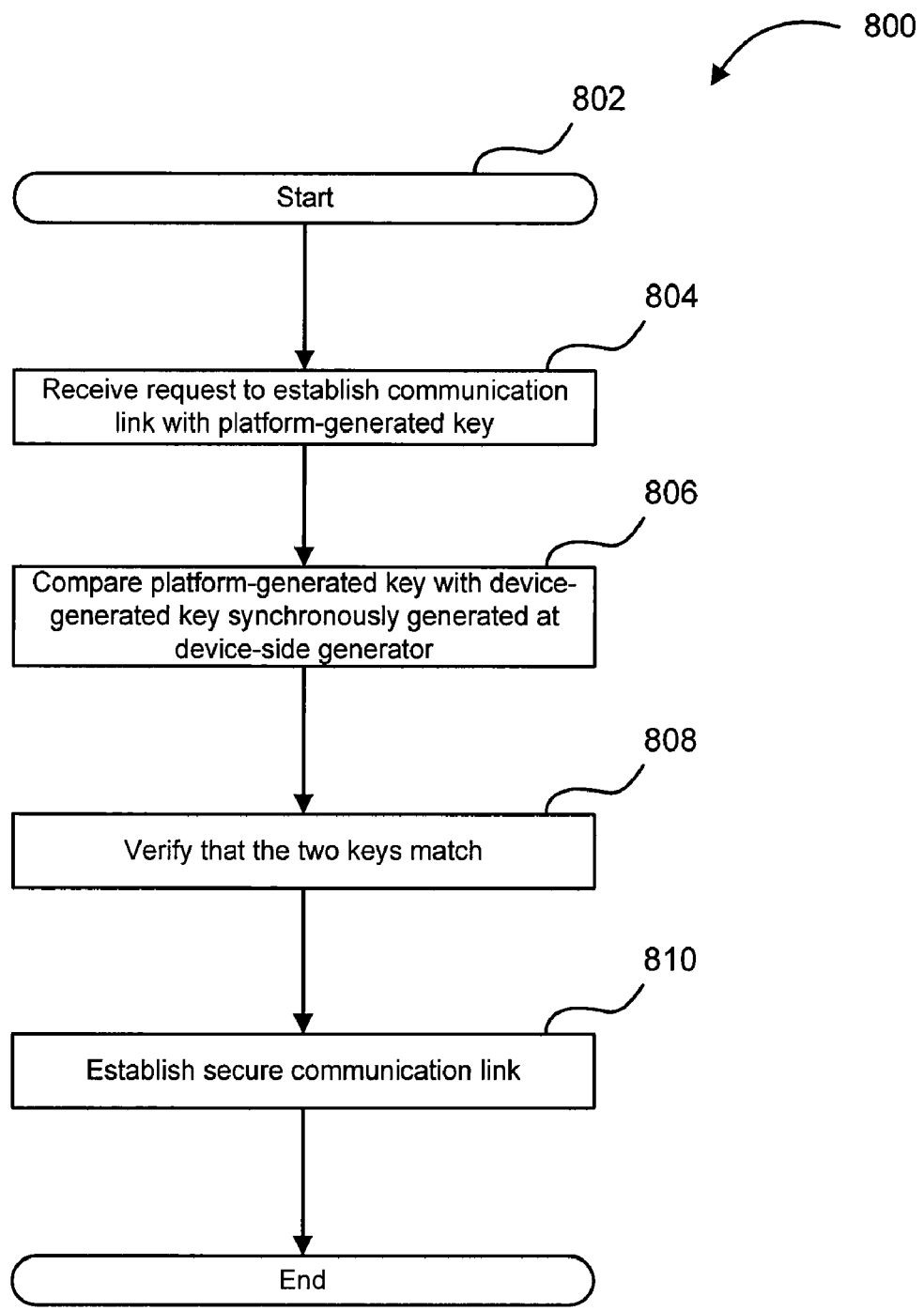
FIG. 8A shows in flowchart form a method of establishing a secure communication link in an enterprise communications platform for a PBX-initiated call in accordance with one embodiment.
Figure 8B:
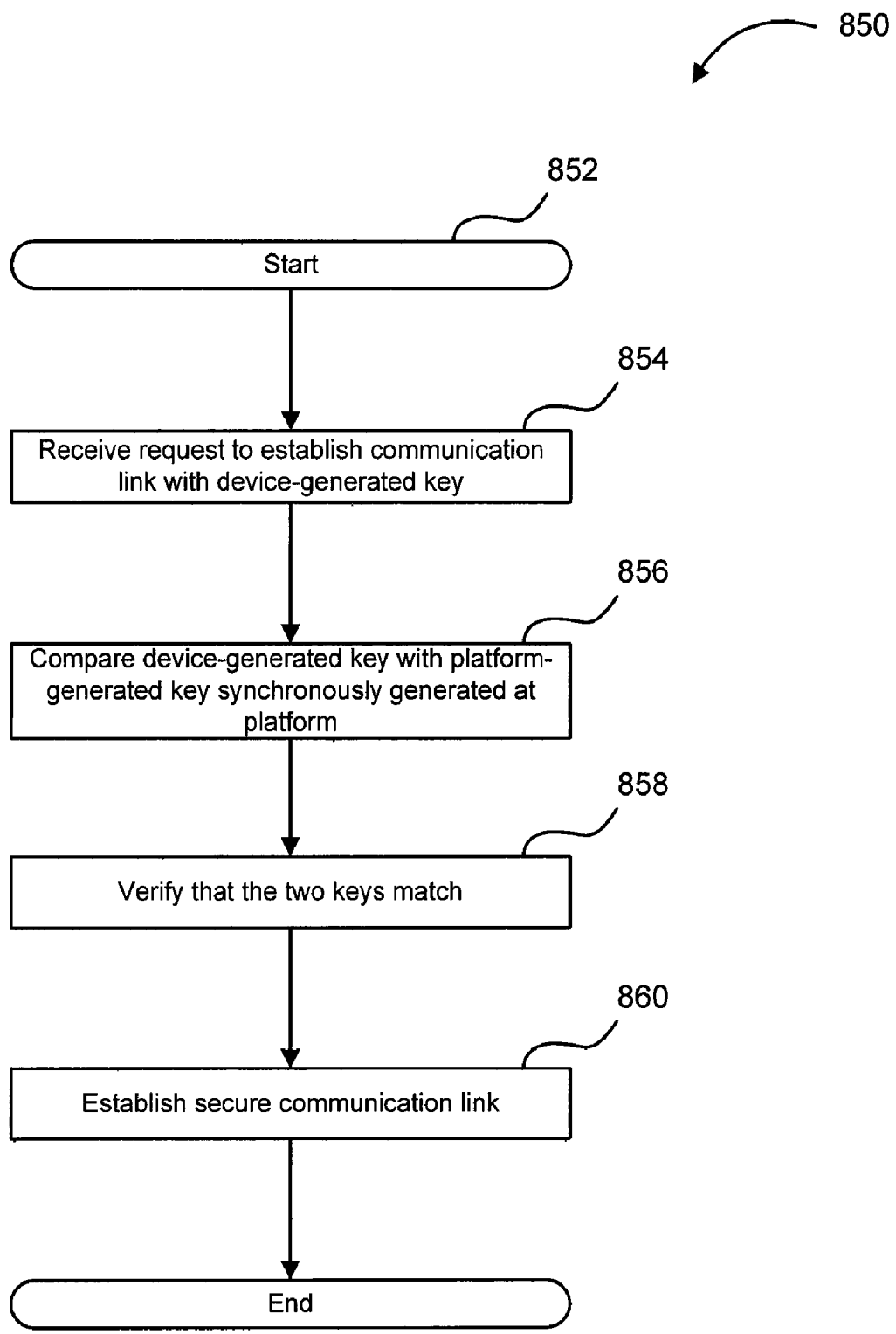
FIG. 8B shows in flowchart form a method of establishing a secure communication link in an enterprise communications platform for a mobile-initiated call in accordance with one embodiment.

Referring to FIGS. 8A and 8B, methods 800 and 850 are shown in flowchart form for establishing a secure communication link in an enterprise communications network in accordance with some embodiments. The methods 800 and 850 may be useful, for example, where there is no data connection available between the device 11 and the enterprise communications platform 14.

As described above with reference to FIG. 10, there is provided a device-side key generator 1002 and a platform-side key generator 1004, which are synchronized to each other.

Method 800 begins at block 802. In this example, a secure communication link is established for a PBX-initiated, or more generally a platform-initiated, call.

At block 804, a request from the platform 14 to establish a communication link is received at the device 11. The request includes a platform-generated synchronized random key generated at the platform-side key generator 1004. Generation of this platform-generated key may be through the use of a hash key known to both the platform-side and the device-side generators 1004, 1002 or any other method as discussed above. The platform-side key may be newly generated at the time that the call is made. Alternatively, the device-side key may be retrieved from historical data. The historical data may include a record of the last generated key.

At block 806, the platform-generated key is received at the device 11 and is compared to a device-generated synchronized random key generated at the device-side key generator 1002. The platform-generated key may be received in the form of a calling party number, for example where the platform-generated key is a dialable series of digits. Common call-ID detection methods may be used. The comparison may be performed by a comparator associated with the device-side key generator 1002. The device-generated key may be generated in response to reception of the request from the platform 14. Alternatively, the device-generated key may have been generated in parallel with the platform-generated key and may be retrieved from historical data.

At block 808, the two keys are compared and based on the comparison, establishment of the communication session may be authorized or prohibited. In this example, the keys are verified to be the same. Thus, the identity of the platform 14 may be verified to the device 11.

At block 810, a secure communication link between the device 11 and the platform 14 is established. This may include the device 11 accepting or answering the call from the platform 14.

Method 850 begins at block 852. In this example, a secure communication link is established for a device-initiated call. The steps may be similar to those described for the method 800, but accordingly mirrored.

At block 854, a request from the device 11 to establish a communication link is received at the platform 14. The request includes a device-generated synchronized random key generated at the device-side key generator 1002. Generation of this device-generated key may be through the use of a hash key known to both the platform-side and the device-side generators 1004, 1002 or any other method as discussed above. Similar to the method 800, the device-generated key may be retrieved from historical data.

At block 856, the device-generated key is received at the platform 14 and is compared to a platform-generated key generated at the platform key generator 1004. The device-generated key may be received in the form of the number being dialed to the platform, for example where the device-generated key is a dialable series of digits. Common call-ID detection methods may be used. The comparison may be performed by a comparator associated with the platform-side key generator 1004. Similar to the method 800, the platform-generated key may be retrieved from historical data.

At block 858, the two keys are compared, and based on the comparison, establishment of the communication session may be authorized or prohibited. In this example, the keys are verified to be the same. Thus, the identity of the device 11 may be verified to the platform 14.

At block 860, a secure communication link between the platform 14 and the device 11 is established.

Figure 9A:
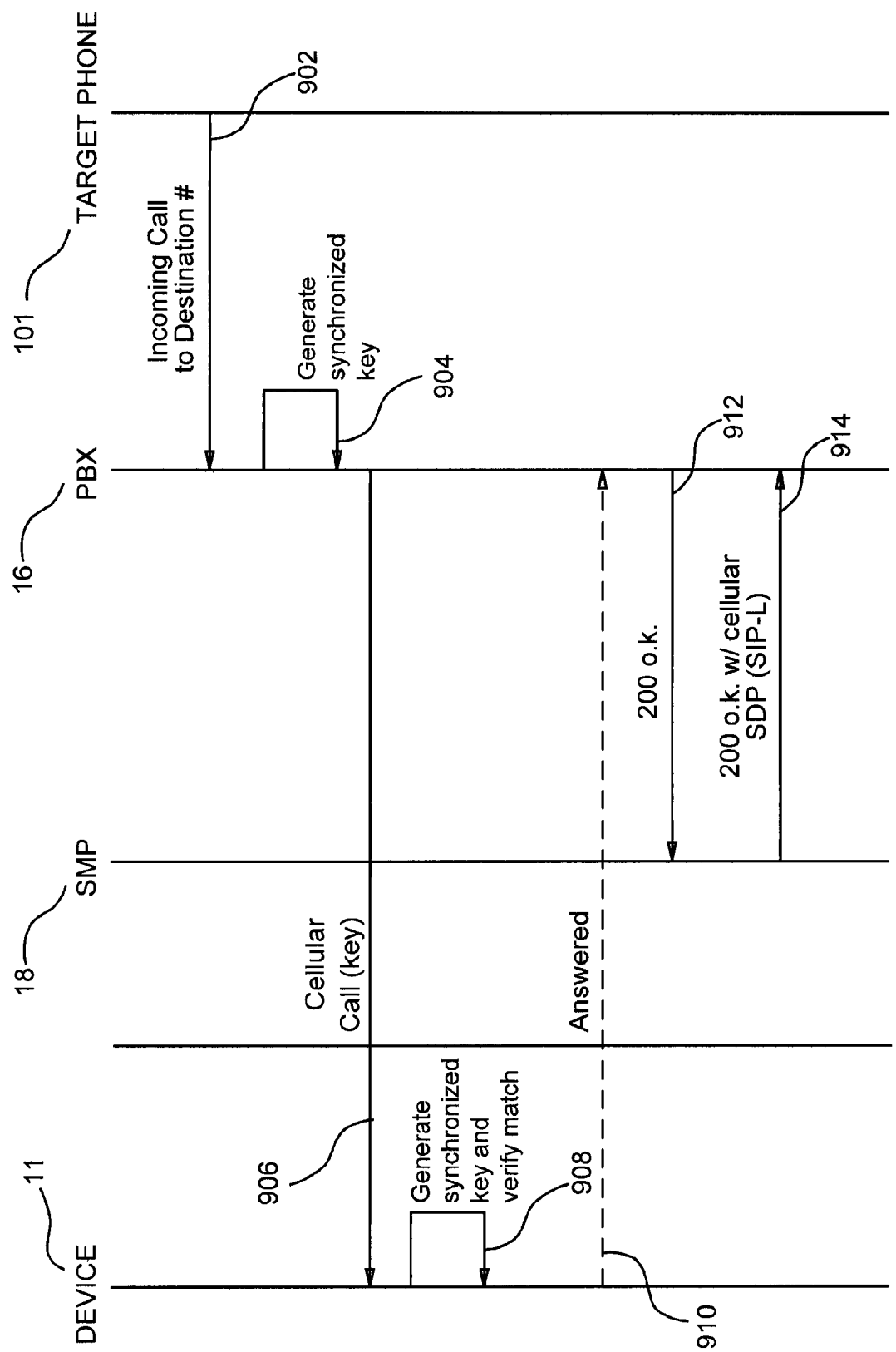
FIG. 9A is a signaling diagram generally indicating how the secure communication link is established in the method of FIG. 8A.
Figure 9B:
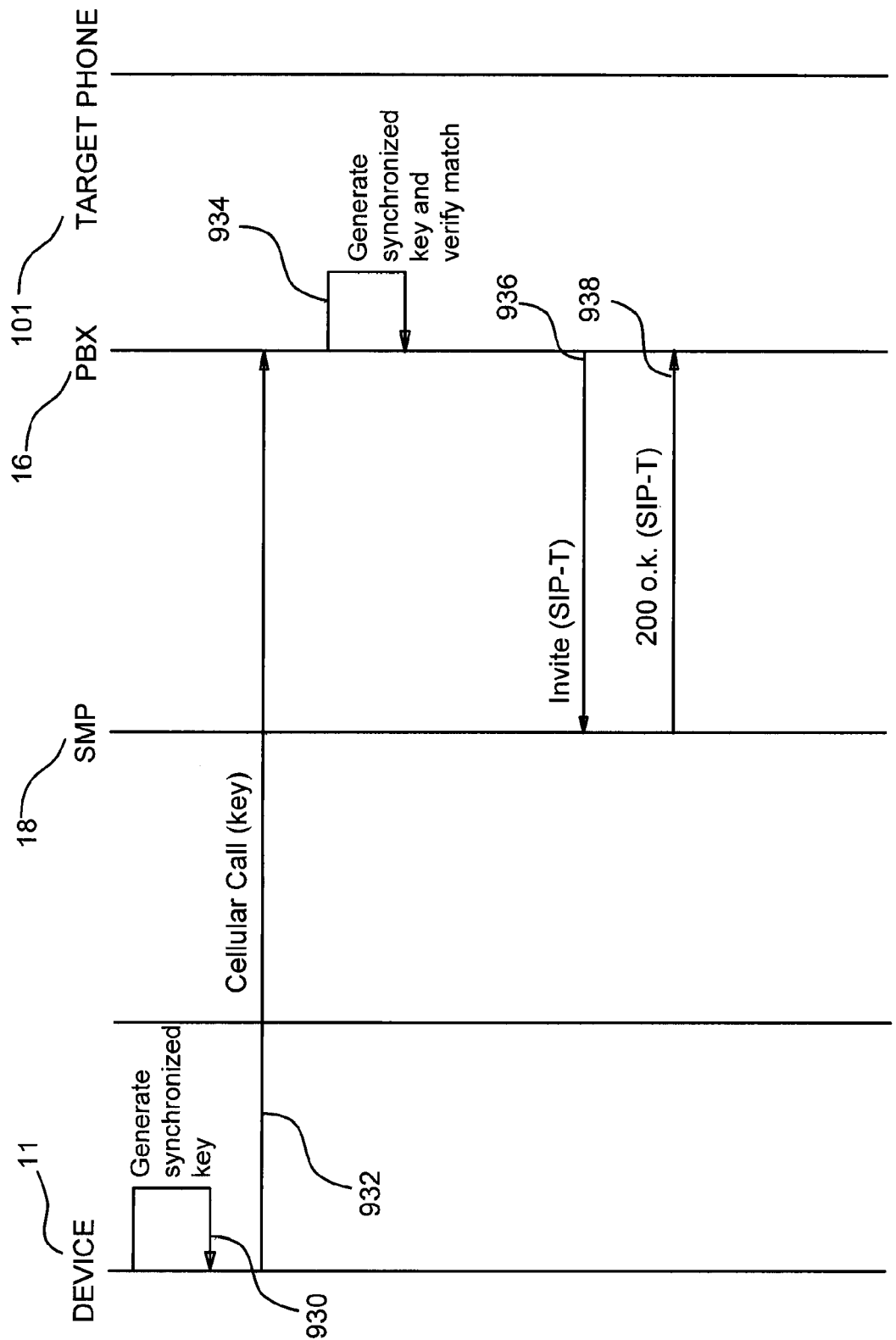
FIG. 9B is a signaling diagram generally indicating how the secure communication link is established in the method of FIG. 8B.

Reference is now made to FIGS. 9A and 9B. FIGS. 9A and 9B are signaling diagrams showing general processes for establishing a secure communication link in an enterprise communications network in accordance with some embodiments. The FIGS. 9A and 9B generally may be suitable for carrying out the methods 800 and 850, respectively.

Reference is first made to FIG. 9A, which shows a general process for establishing a secure communication link for a PBX-initiated, or more generally platform-initiated, call.

At a block 902, an incoming call request from the target phone 101 is received at the PBX 16.

At a block 904, a platform-generated synchronized random key is generated by the platform-side key generator 1004. As discussed previously, the platform-generated key may alternatively be retrieved from historical data rather than being newly generated. As previously discussed, the platform-side key generator 1004 may, for example, be provided in the PBX 16, in the SMP 18, or elsewhere in the enterprise platform 14.

At a block 906, the PBX 16 makes a call to the device 11 using the platform-generated key. The platform-generated key may be detected by the device 11.

At a block 908, a device-generated synchronized random key is generated by the device-side key generator 1002 and is used to verify a match with the platform-generated key. As discussed previously, the device-generated key may alternatively be retrieved from historical data rather than being newly generated.

At a block 910, having verified a match between the two keys and hence verified the identity of the PBX 16, the device 11 answers the call.

At a block 912, a "200 OK" signal is sent from the PBX 16 to the SMP 18, acknowledging that the cellular call leg to the device 11 is established.

At a block 914, a "200 OK" signal is sent from the SMP 18 to the PBX 16 in response, acknowledging that the call leg to the target phone 101 is also established.

Reference is now made to FIG. 9B, which shows a general process for establishing a secure communication link for a device-initiated call.

At a block 930, a device-generated synchronized random key is generated by the device-side key generator 1002. As discussed previously, the device-generated key may alternatively be retrieved from historical data rather than being newly generated. As previously discussed, the device-side key generator 1002 may, for example, be a module resident in the memory of the device 11, or may be a module external to the device 11.

At a block 932, the device 11 makes a call to the PBX 16 using the device-generated key. The device-generated key may be detected by the PBX 16.

At a block 934, a platform-generated synchronized random key is generated by the platform-side key generator 1004 and is used to verify a match with the device-generated key. As discussed previously, the platform-generated key may alternatively be retrieved from historical data rather than being newly generated.

At a block 936, having verified a match between the two keys and hence verified the identity of the PBX 16, the PBX 16 sends an invite over SIP-T to the SMP 18. The invite may include the number that was dialed, for example where the device-generated key was used to dial in to the platform.

At a block 938, "2:00 OK" signal is sent over SIP-T from the SMP 18 to the PBX 16, acknowledging that the call leg to the mobile device 11 is established.

FIGS. 9A and 9B show example processes for establishing a secure communication link between the device 11 and the platform 14. Once that leg of the call has been established, the call leg with the target phone 101 may be established and/or the call legs joined as described above.

Certain adaptations and modifications of the described embodiments can be made. Therefore, the above discussed embodiments are considered to be illustrative and not restrictive.

What is claimed is:

1. An enterprise communication system adapted for establishing secure wireless communication sessions, the system comprising:
    an enterprise platform adapted for establishing communications sessions with one or more wireless devices, and for transmitting signals to and receiving signals from the one or more wireless devices;
    a platform-side automatic synchronized random key generator associated with the enterprise platform for generating platform-generated synchronized random keys;
    the enterprise platform being adapted to:
        receive one or more signals representing a request to establish a communication session between the enterprise platform and at least one wireless device;
        receive a wireless device-generated synchronized random key from the at least one wireless device;
        compare the wireless device-generated synchronized random key to a platform-generated synchronized random key synchronized to the wireless device-generated synchronized random key; and
        based on the comparison, output a signal representing a response to authorize or prohibit establishment of the communication session.

2. The system of claim 1 wherein the platform-side automatic synchronized random key generator is adapted to generate platform-generated synchronized random keys at set time intervals synchronized to the at least one wireless device.

3. The system of claim 2 wherein the time intervals are in the range of 5 seconds to 1 minute.

4. The system of claim 1 wherein the platform-generated synchronized random key is a dialable series of digits.

5. The system of claim 1 wherein the platform-generated synchronized random keys are generated using a predictable number generation algorithm.

6. The system of claim 5 wherein the algorithm is selected from the group consisting of: hash key, strange attractor, and random number generation.

7. The system of claim 1 wherein the enterprise platform comprises a private branch exchange (PBX) and a service management platform (SMP).

8. The system of claim 7 wherein the platform-side automatic synchronized random key generator is associated with the PBX.

9. A wireless device adapted for establishing secure wireless communication sessions with an enterprise platform and for transmitting signals to and receiving signals from the enterprise platform, the wireless device comprising:
a device-side automatic synchronized random key generator for generating wireless device-generated synchronized random keys;
the wireless device being adapted to:
receive one or more signals representing a request to establish a communication session between the wireless device and the enterprise platform;
receive a platform-generated synchronized random key from the enterprise platform;
compare the platform-generated synchronized random key to a wireless device-generated synchronized random key synchronized to the platform-generated synchronized random key; and
based on the comparison, output a signal representing a response to authorize or prohibit establishment of the communication session.

10. The wireless device of claim 9 wherein the device-side automatic synchronized random key generator is adapted to generate wireless device-generated synchronized random keys at set time intervals synchronized to the enterprise platform.

11. The wireless device of claim 10 wherein the time intervals are in the range of 5 seconds to 1 minute.

12. The wireless device of claim 9 wherein the wireless device-generated synchronized random key is a dialable series of digits.

13. The wireless device of claim 9 wherein the wireless device-generated synchronized random keys are generated using a predictable number generation algorithm.

14. The wireless device of claim 13 wherein the algorithm is selected from the group consisting of: hash key, strange attractor, and random number generation.

15. A method, in a server of an enterprise platform, for establishing a secure communication link between a wireless communication device in an enterprise communications system and the enterprise platform, the method comprising:
receiving one or more signals representing a request to establish a communication session from the wireless device;
receiving a wireless device-generated synchronized random key from the wireless device;
receiving a platform-generated synchronized random key from the enterprise platform, the platform-generated synchronized random key being synchronized with the wireless device-generated synchronized random key;
comparing the wireless device-generated synchronized random key and the platform-generated synchronized random key; and
if the keys match, outputting one or more signals authorizing the establishment of the secure communication link between the wireless device and the platform.

16. The method of claim 15 wherein the server receives platform-generated synchronized random keys at set synchronized time intervals and stores them for later retrieval, wherein receiving the platform-generated synchronized random key comprises retrieving the platform-generated synchronized random key from storage.

17. The method of claim 16 wherein the time intervals are in the range of 5 seconds to 1 minute.

18. The method of claim 15 wherein the platform-generated synchronized random key is a dialable series of digits.

19. The method of claim 15 wherein the platform-generated synchronized random key is generated using a predictable number generation algorithm.

20. The method of claim 19 wherein the algorithm is selected from the group consisting of: hash key, strange attractor, and random number generation.

21. The method of claim 15 wherein the enterprise platform comprises a private branch exchange (PBX) and a service management platform (SMP), wherein the method is carried out in the PBX, further comprising:
sending an invitation signal from the PBX to the SMP; and
sending an okay signal from the SMP to the PBX in response.

22. A method, in a wireless communication device in an enterprise communications system, for establishing a secure communication link between the wireless device and an enterprise platform, the method comprising:
receiving one or more signals representing a request to establish a communication session from the platform;
receiving a platform-generated synchronized random key from the platform;
receiving a wireless device-generated synchronized random key, the wireless device-generated synchronized random key being synchronized with the platform-generated synchronized random key;
comparing the wireless device-generated synchronized random key and the platform-generated synchronized random key; and
if the keys match, outputting one or more signals authorizing the establishment of the secure communication link between the wireless device and the platform.

23. The method of claim 22 wherein the wireless device receives wireless device-generated synchronized random keys at set synchronized time intervals and stores them for later retrieval, wherein receiving the wireless device-generated synchronized random key comprises retrieving the wireless device-generated synchronized random key from storage.

24. The method of claim 23 wherein the time intervals are in the range of 5 seconds to 1 minute.

25. The method of claim 22 wherein the wireless device-generated synchronized random key is a dialable series of digits.

26. The method of claim 22 wherein the wireless device-generated synchronized random key is generated using a predictable number generation algorithm.

27. The method of claim 26 wherein the algorithm is selected from the group consisting of: hash key, strange attractor, and random number generation.

* * * * *